Figures 1, 2, 3, 4:
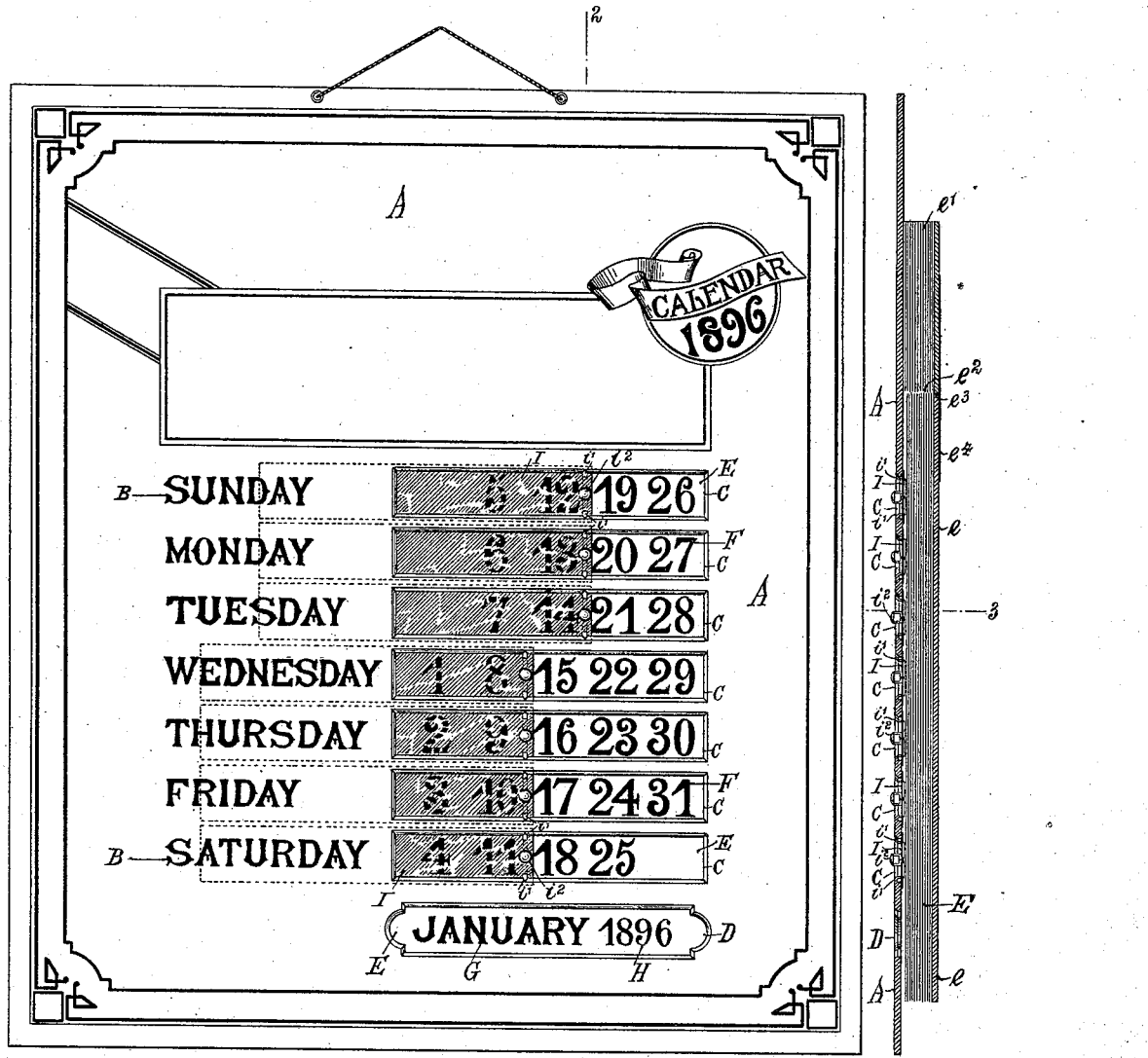

(No Model.)　　　　　W. T. WILSON.　　　5 Sheets—Sheet 1.
SHEET CALENDAR.

No. 571,031.　　　　　　　Patented Nov. 10, 1896.

Witnesses　　　　　　　　　　Inventor
H. van Oldenneel　　　　　William Trafford Wilson
A. S. Büsing　　　　　　　by Richardson
　　　　　　　　　　　　　　　　Attorneys (No Model.)  5 Sheets—Sheet 2.

W. T. WILSON.
SHEET CALENDAR.

No. 571,031.  Patented Nov. 10, 1896.

Witnesses
H. van Oldenneel
A. S. Büsing

Inventor
William Trafford Wilson
by Richardson
Attorneys (No Model.)　　　　　　W. T. WILSON.　　　　5 Sheets—Sheet 3.
SHEET CALENDAR.

No. 571,031.　　　　　　　　　　Patented Nov. 10, 1896.

Witnesses　　　　　　　　　　　　　　Inventor
H. van Oldenneel　　　　　　　William Trafford Wilson
A. S. Büsing　　　　　　　　　by Richards
　　　　　　　　　　　　　　　　Attorneys

THE NORRIS PETERS CO., PHOTO-LITHO., WASHINGTON, D. C.

(No Model.) 5 Sheets—Sheet 4.

W. T. WILSON.
SHEET CALENDAR.

No. 571,031. Patented Nov. 10, 1896.

Witnesses
H. van Oldemeel
A. S. Büsing

Inventor
William Trafford Wilson
by Richardson
Attorneys (No Model.)　　　　　　　　　　　　　　　　5 Sheets—Sheet 5.
W. T. WILSON.
SHEET CALENDAR.
No. 571,031.　　　　　　　　　Patented Nov. 10, 1896.
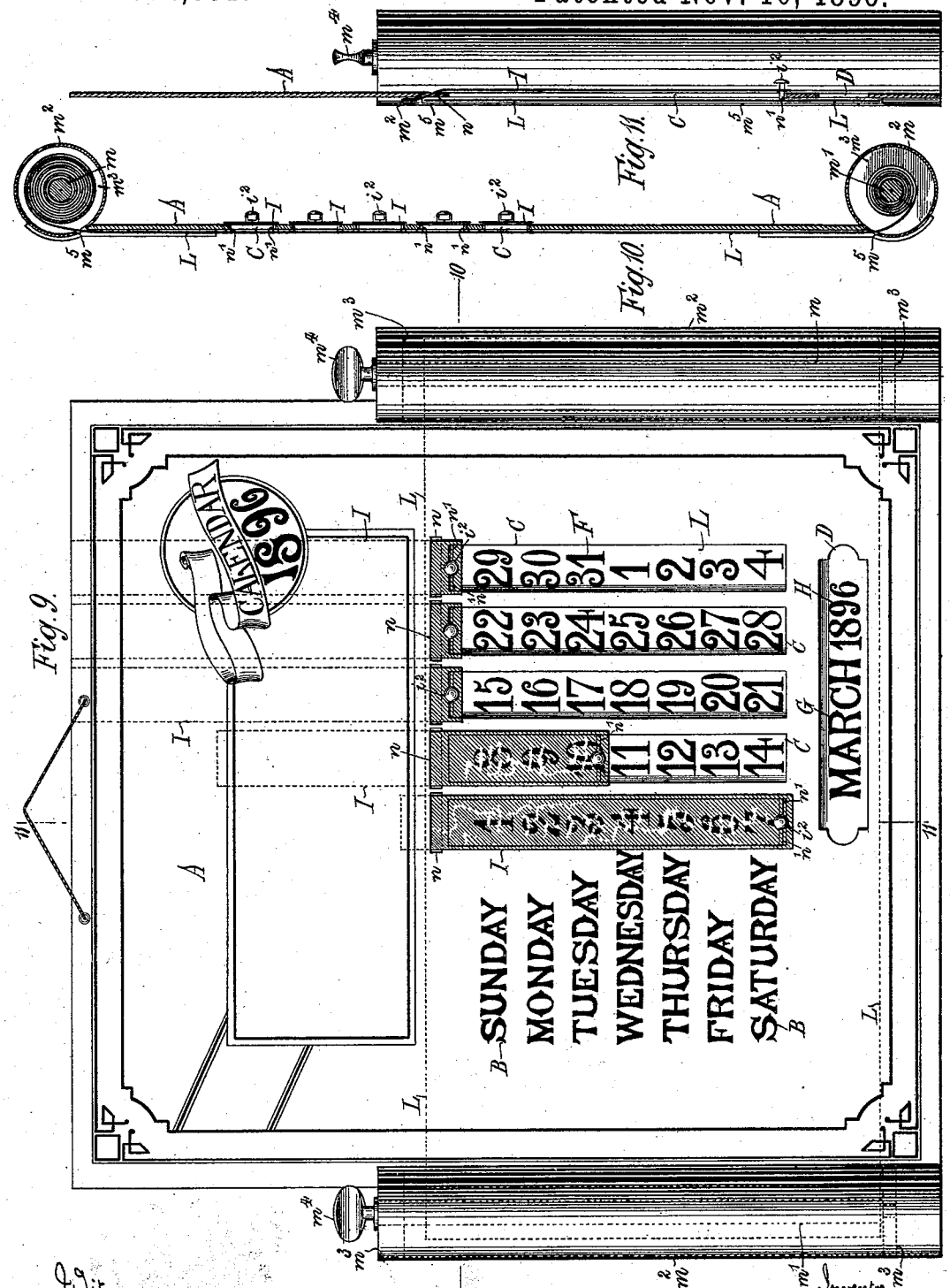
Witnesses
H. van Oldenneel
A. S. Büsing
Inventor
William Trafford Wilson
by Richards
Attorneys

UNITED STATES PATENT OFFICE.

WILLIAM TRAFFORD WILSON, OF LONDON, ENGLAND.

SHEET CALENDAR.

SPECIFICATION forming part of Letters Patent No. 571,031, dated November 10, 1896.

Application filed January 29, 1896. Serial No. 577,301. (No model.) Patented in England November 30, 1895, No. 22,940.

*To all whom it may concern:*

Be it known that I, WILLIAM TRAFFORD WILSON, a subject of the Queen of the United Kingdom of Great Britain and Ireland, residing at No. 13 Rood Lane, in the city of London, England, have invented certain new and useful Improvements in Sheet-Calendars, (for which I have obtained a patent in Great Britain and Ireland, No. 22,940, dated November 30, 1895;) and I do hereby declare that the following is a full, clear, and exact description of the invention, reference being made to the accompanying drawings, which are to be taken as part of this specification and read therewith, and one which will enable others skilled in the art to which it appertains to make and use the same.

My invention relates to improvements in calendars; and the object of it is to indicate what portion of the term exhibited at one time by the calendar has elapsed.

It consists, therefore, in the combination of calendar, a stiff front sheet or plate, (hereinafter referred to as a "foundation,") slots therein, each adapted to exhibit a certain number of the dates (hereinafter referred to as "ordinal numbers") on the calendar, and a curtain mechanism adapted to indicate the number of days that have passed by being adjusted to stand in front of the corresponding ordinal numbers.

It further includes the combination, with the above-mentioned foundation and curtain mechanism, of suitable means for changing the calendar.

The present invention requires, indeed, that the calendar be changeable, but it does not impose any limits upon the means by which the calendar is made changeable. Such means, in more than one form, too, are well known. In one of the well-known types of changeable calendar the calendar consists of twelve sheets, one for each month in the year, superposed in proper order upon a backing, to which they are made fast, the calendar being changed by the tearing of the front sheet from before its fellows at the end of the respective month. In another type a ribbon bearing the ordinal numbers is made fast by its ends to two independent and parallel rollers, respectively, each roller being capable of rotary motion about its axis, the calendar being changed by winding as much of the ribbon off one roller on to the other as may be necessary to exhibit the proper ordinal number. The use of each of the above types is illustrated in the accompanying drawings.

In the first-mentioned well-known type of calendar the ordinal numbers are arranged in rows or in columns, each row or column relating to not more than one week. So far this arrangement is adopted by the present invention. Each of the above-mentioned slots is therefore long enough to exhibit the ordinal numbers of one week.

The invention does not limit me in respect to the number of slots in a foundation. I prefer that there should be as many as there are rows or columns of ordinal numbers on the calendar in respect of the longest month in the year, in order that all the ordinal numbers in that month may be exhibited at once. Experience has demonstrated the convenience of all the ordinal numbers relating to one month being exhibited at once, hence my preference for the number of slots just mentioned. At the same time I wish it to be distinctly understood that the combination of a smaller number of slots and the ordinal numbers for a corresponding number of weeks exhibited thereat is, with the respective curtain, within the scope of my invention. Each slot (as many as there may be) is provided with a sliding curtain adapted to indicate the number of days that have passed by being adjusted to stand in front of the corresponding ordinal numbers. There are provided for each curtain suitable guides to keep it in proper position with reference to its slot, as well as thumb-bits for moving the curtain. The combination of curtain or curtains with the slotted foundation is the distinguishing of the present invention. I do not pretend to be the inventor of a foundation having one or more apertures therein and changeable calendar sheets or ribbons behind them, but I believe myself to be the first inventor of the combination of foundation, one or more slots in it long enough to exhibit at once as many ordinal numbers as relate to a definite term of days, such as a week, calendar, and sliding curtain adjustable in front of one or more of the ordinal numbers exhibited by the calendar at the respective slot.

Figure 5:
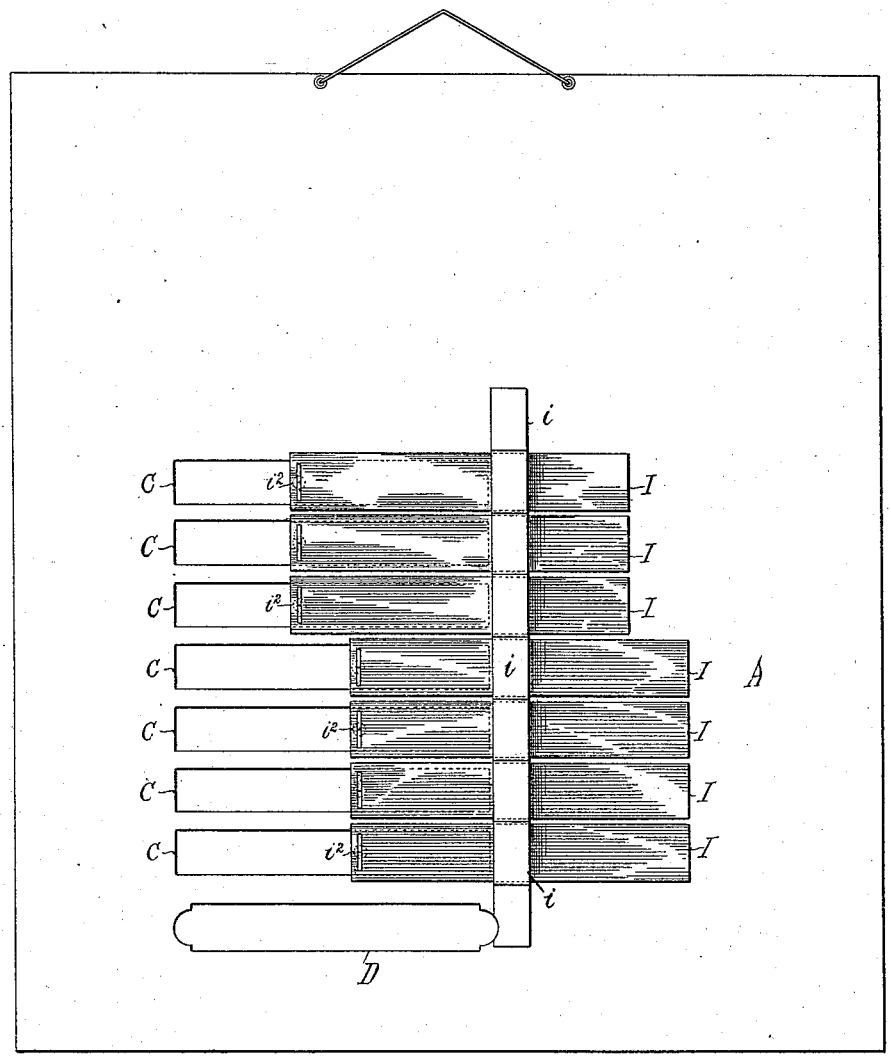
Figures 6, 7:
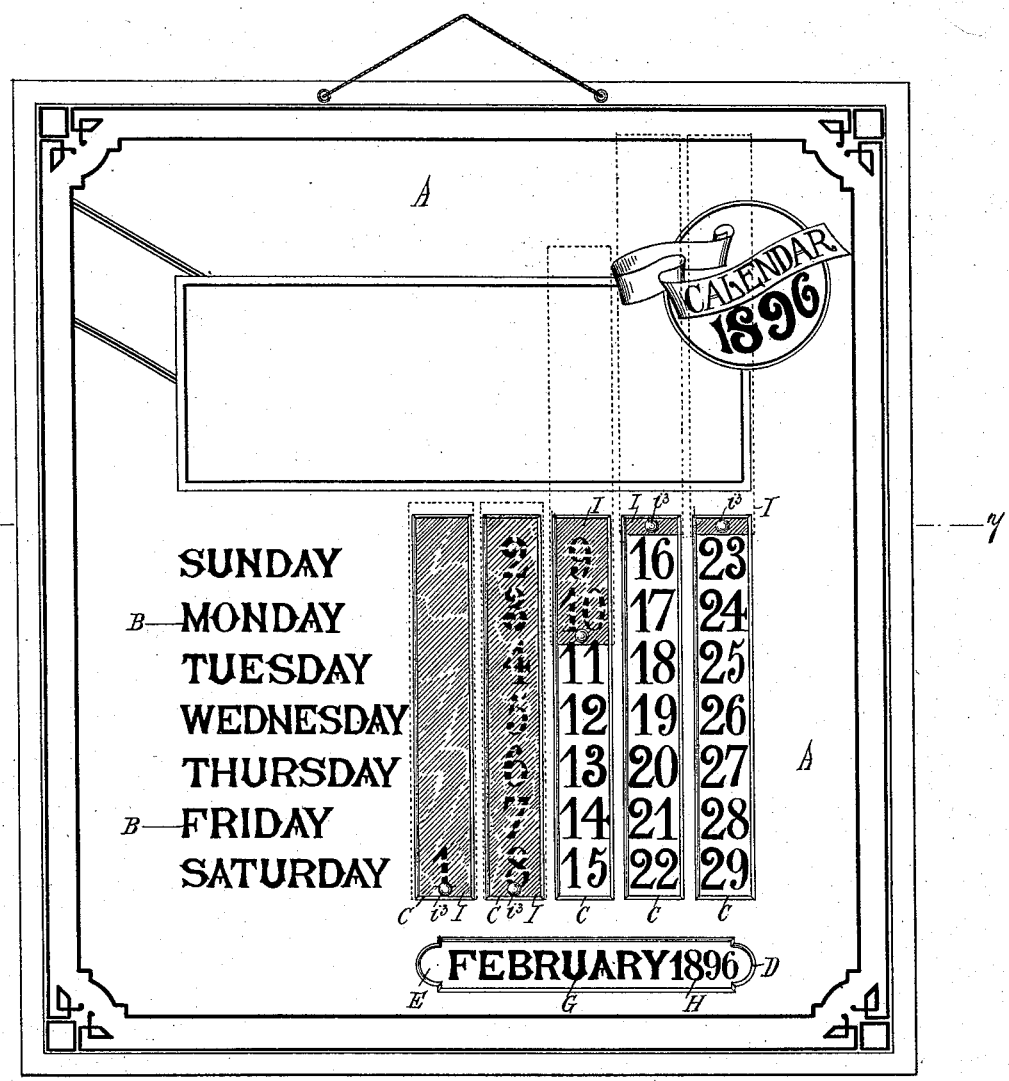
Figure 8:
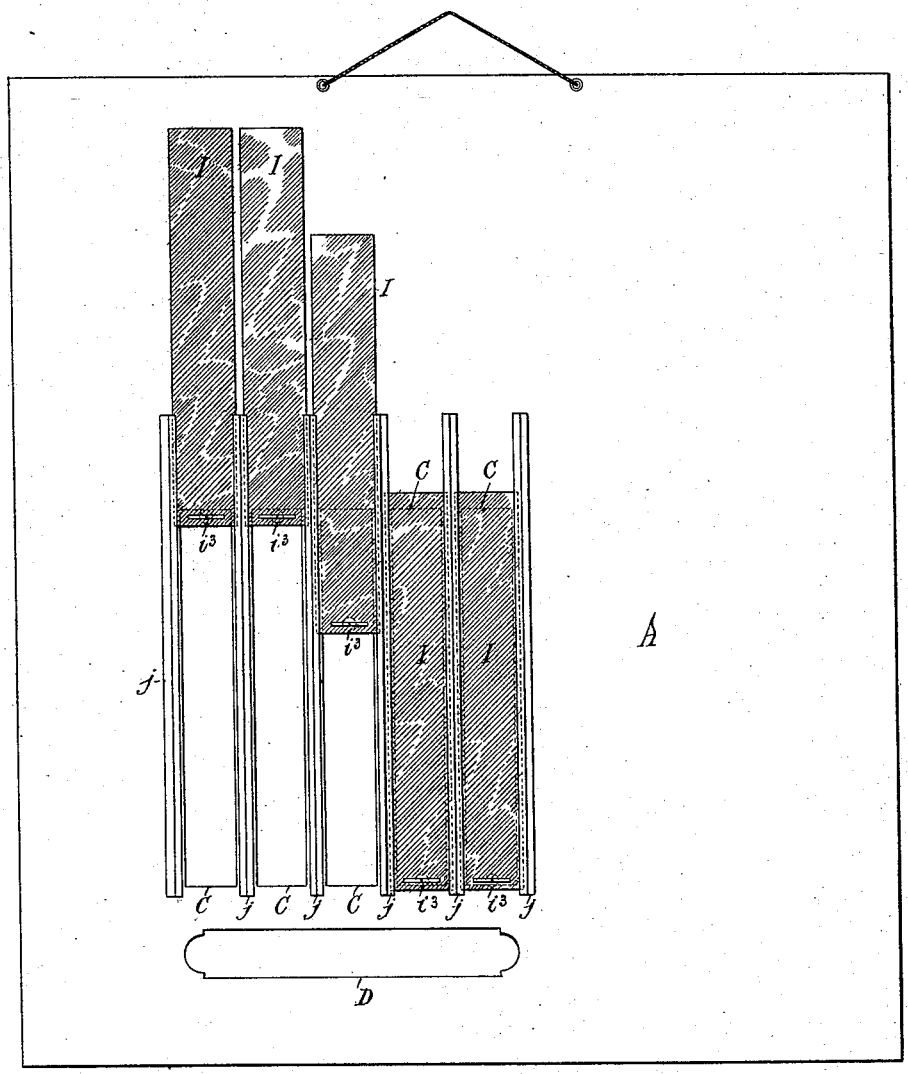

Figure 1 is a front elevation of a calendar made according to the present invention and having the names of the days arranged in a column, the ordinal numbers in rows, and the curtains adapted to slide behind horizontal slots. Fig. 2 is a vertical section taken along the line 2 2 of Fig. 1. Fig. 3 is a horizontal section through the foundation and curtains along the line 3 3 of Figs. 1 and 2. Fig. 4 is an elevation of a detached curtain. Fig. 5 is a rear elevation of the foundation and the curtains before the combination of the calendar-sheets therewith. Fig. 6 is a front elevation of a calendar made according to my invention and having the names of the days arranged in a column, the ordinal numbers in columns, and the curtains adapted to slide behind vertical slots. Fig. 7 is a horizontal section through the foundation and curtains along the line 7 7 of Fig. 6. Fig. 8 is a rear elevation of the foundation and the curtains before the combination of the calendar-sheets therewith. Fig. 9 is a front elevation of a calendar made according to my invention and having the names of the days arranged in a column, the ordinal numbers in columns, and the curtains adapted to slide in front of vertical slots. Fig. 10 is a horizontal section taken along the line 10 10 of Fig. 9. Fig. 11 is a vertical section taken along the line 11 11 of the same figure.

The differences between the improved calendars illustrated in Figs. 1 to 5, 6 to 8, and 9 to 11 are confined to the position and number of the slots and curtains, to the means by which the curtains are held to the foundation, and to the type of the calendar. All of these differences are of such minor importance that neither the nature nor the scope of the invention is affected by them.

*Foundation.*—A is the foundation. It consists of a sheet of stiff cardboard or equivalent material.

B B are the names of the days of the week marked thereon columnwise and sufficiently near to one side of the foundation (preferably the left one) for the position of such column of names and the series of slots next described to be symmetrical.

D is a horizontal slot in the foundation. Its function is to exhibit the name of the month on the calendar-sheet E or calendar-ribbon L, as the case may be, and may be long enough or wide enough to exhibit the ordinal number of the year (described farther on) also, if that be indicated on the said sheet or ribbon.

*Slots.*—C C are the slots in the foundation A. All are of equal length and width and are parallel with each other, the function of each slot being to exhibit all the ordinal numbers relating to the respective week at once in proper relation to the day-names B B. They are therefore arranged accordingly. It is optional whether they are horizontal, as illustrated in Figs. 1, 2, and 3, or vertical, as illustrated in Figs. 6, 7, 8, 9, 10, and 11. The number of them, when there are enough to exhibit at once all the ordinal numbers belonging to a month, is obviously affected by their position.

The figures illustrate the foundation of the improved calendar as slotted to exhibit all the ordinal numbers of one month at once. It has been already explained that my invention includes the combination of a smaller number of slots and curtains, even so small a number as one of each. The illustration of such a combination of one slot and one curtain is included in the accompanying drawings.

*Changeable calendar.*—Figs. 1 to 8 illustrate a changeable calendar consisting of twelve sheets superposed one upon the other in the proper order.

E E are the calendar-sheets, one for each calendar month. Figs. 1 and 6 show eleven sheets. The twelfth is pasted down flat upon the face of the backing-sheet $e$. The twelve are pasted or blocked together along their tops $e'$ in proper chronological order one upon the other, the earliest one in front. The usual provision is made for the removal of each front calendar-sheet E from its fellows, such provision consisting of a row of perforations $e^2$ across each sheet.

Each of the twelve calendar-sheets has marked upon it the ordinal figures F F of the days in it, properly arranged as to row and column, as heretofore on sheet-calendars, to correspond with the names B B of the days on the foundation A. It has also the name G of the respective month and, if desired, the ordinal number H of the respective year. It is held fast to the foundation A by any suitable means with the lines or columns of numbers F and names G on the sheets E E standing opposite the respective slots C D in such foundation. Some provision is therefore necessary for giving access to the sheets E E for the purpose of tearing off each front one from the blocked top $e'$ at the end of each month. Such provision consists in a hinge in the backing-sheet $e$ immediately behind and parallel with the rows of perforations $e^2$. Any type of hinge may be used. I have shown one consisting of a severing cut $e^3$ through the sheet $e$, and a piece of cloth $e^4$ pasted on the rear face of the backing-sheet $e$ and extending from the said cut equally on both sides of it.

An examination of Fig. 2 may incline the observer to think that the calendar-sheets E E and backing-sheet $e$ could not be swung back on the hinge without ripping all or most of the rows of perforations $e'$; but it must be explained that it is the exaggerated thickness of the combination of calendar-sheets which suggests this risk. In point of fact the said sheets will lie too close together to prevent any ripping along the said rows of perforations when they are swung back. It was necessary to exaggerate the thickness of the said combination in the figure in question, otherwise it would have been impossible to distinguish one calendar-sheet from another.

*Curtain mechanism.*—This consists of a combination of sliding curtain and curtain-guide. I I are the curtains, one to each slot. A curtain is sufficiently wider than a slot to obviate the risk of its side edges working into the slot and jamming against the edges of the latter. It is provided with suitable guides in which it can be moved to and fro in the direction of the length of the slot to cover one or all of the respective ordinal numbers F and by which it will be held up to the foundation A. My invention does not limit me in respect of the detailed construction of these guides, and any construction may be adopted provided that it is capable of providing for the to-and-fro motion above mentioned. The guides illustrated in Figs. 1 to 5 consist of the combination of a loop $i$, fast on the back of the foundation close to and parallel with the end of the respective slot, and a finger $i'$ projecting from each side of the opposite end of the curtain near to the front end of it and standing immediately in front of the respective edge of the slot. The loop $i$ holds the curtain up to the foundation A at one end of the slot, while the fingers $i'$ $i'$ hold the front end of the curtain up to it.

$i^2$ is a knob fast to the front end of a curtain, by which the latter can be drawn forward or pushed back along its slot. The figures in question show a knob $i^2$ and fingers $i'$ $i'$ as incorporated in one piece. They may all three be advantageously made out of an ordinary paper-fastener. This conversion of a paper-fastener into a knob and a pair of fingers is distinctly shown in Fig. 2. The fangs of the fastener are bent to stand out from the edge of the head of the fastener and parallel with each other for a short distance, at the end of which they are brought together abruptly, thereby providing shoulders to rest upon the face of the curtain. These approximated fangs are then pushed through a central hole in the curtain end, bent in opposite directions transversely of the curtain, returned through the latter to the front side of it, and bent outward still transversely of the curtain, this bending outward producing the fingers $i'$ $i'$ above mentioned.

The curtain-guides illustrated in Figs. 7 and 8 consist of an angle-bar $j$, standing up from the rear face of the foundation A, to which it is made fast, close up to and parallel with each side of a slot C, the horizontal flanges overhanging the side edges of the curtain. The knob $i^3$ illustrated in Figs. 6, 7, and 8 is a duplicate of that illustrated in the previous figures, the fingers $i'$ $i'$ being dispensed with for the reason that in the type of guide now being specified a pair of bars $j j$ holds the respective curtain up to foundation A wherever they overhang it. The material of which the curtains are made is no part of the invention, and, further, it may be either opaque or semitransparent, as may be preferred. Bright colored (*e. g.*, green) gelatine or celluloid is very suitable, because it is light and bright, its presence is distinct, and its semitransparency fails to give the calendar a blind look when the curtains are drawn over the majority of the ordinal figures.

Figs. 9 to 11 illustrate a changeable calendar consisting of a ribbon fast by its ends to two rollers, and thereby adapted to be wound off one onto the other. L is the calendar ribbon in question. $m m'$ are the two rollers. Each one is mounted in a case $m^2$, within which it is capable of an independent rotary motion by reason of the roller having its bearings in the ends $m^3$ of the case and a thumb-piece $m^4$ on one end of the roller. $m^5$ is a slot in each case large enough to allow the ribbon L to pass through. The roller-cases $m^2$ $m^2$ are made fast to the margins of the foundation A opposite to each other. Whether they are attached to the top and bottom or to the side margins of it depends entirely upon the direction of the travel of the ribbon L. According to the construction of the calendar illustrated in Figs. 9 to 11 such travel is horizontal. For that reason the two cases are made fast to the respective side margins of the foundation A. If the construction of the calendar required the travel of the ribbon to be vertical, the cases would be fixed to the top and bottom margins.

It will be obvious that the detail construction of the guides may be varied considerably and that such variation comes within the ordinary capacity of the skilled mechanic in the branch of manufacture to which the invention belongs. I consider any type of guide adapted to provide for the above-mentioned to-and-fro motion of the shutter to be within the scope of the present invention.

Whether a curtain is in front or behind its respective slot is immaterial. Figs. 1 to 8 show it on the back of the foundation. Figs. 9 to 11 illustrate the curtains as adapted to slide and stand in front of their respective slots. Each curtain-guide consists of a slot $n$ in the foundation A, and through which the curtain is passed, two fingers $n'$ projecting from each side of the curtain near to the front end of it and standing immediately behind the respective edges of the slot C. The combination of fingers $n'$ $n'$ and knob $i^3$ illustrated is substantially identical with that described with reference to Figs. 1 to 3, the only difference being that the fingers $n'$ $n'$ stand behind the foundation A instead of in front of it, a change of position necessitated by the change in that of the curtain.

The use of the invention is distinctly indicated in the figures.

Fig. 1 shows the calendar exhibiting the calendar for the month of January of the current year. At the end of each day the respective curtain has been drawn forward till its front end stands over the respective ordinal number F. Fourteen days are indicated as having elapsed, the current day being the 15th of the month. Fig. 6 shows that ten days of the month of February of the same year have elapsed and that the 11th is the current day. Fig. 9 shows that ten days of the month of March of the same year have elapsed and that the current day is the 11th of that month.

I claim—

1. The combination of slotted foundation; calendar behind it, and a series of independent shutters adapted to obscure the ordinal figures on the calendar otherwise visible through the slotted foundation.

2. The combination of foundation; a series of slots in it; a calendar behind it; a provision for making the calendar present the proper portion of it at the said slots; and an adjustable shutter to each slot capable of being moved along it.

3. The combination of slotted foundation, a calendar behind it; and an adjustable shutter to each slot capable of being moved along it in front of the respective ordinal numbers in the said calendar.

4. The combination of foundation; calendar-sheets held detachably to the back thereof; a backing held to the back calendar-sheet; provision consisting of a hinge in the said backing and rows of perforations through the said calendar-sheets, for the removal of each front calendar-sheet from its fellows; slots in the foundation respectively opposite the rows of or columns of ordinal figures on the calendar-sheets; names of the days of the week on the face of the foundation; shutters movable to and fro along the respective slots in the foundation and adjustable in front of the calendar-sheet; name of the respective month on each calendar-sheet and a slot in the foundation opposite such name.

5. The combination of foundation-sheet; slots therein; names of the days of the week against the said slots respectively; changeable calendar-sheet behind the foundation and held thereto in a proper position for presenting the ordinal numbers on it behind the said slots respectively and adjustable shutters capable of being adjusted in front of the ordinal numbers on the calendar-sheet for the time being exhibited.

In witness whereof I have hereunto affixed my signature in presence of two witnesses.

WILLIAM TRAFFORD WILSON.

Witnesses:
CHAS. S. WOODROFFE,
JOSEPH LAKE.